(12) United States Patent
Suda et al.

(10) Patent No.: US 6,385,177 B1
(45) Date of Patent: May 7, 2002

(54) IMAGE COMMUNICATION APPARATUS, METHOD, AND SYSTEM, AND IMAGE COMMUNICATION PROCESSING PROGRAM CONTAINED IN COMPUTER-READABLE MEDIUM

(75) Inventors: Hirofumi Suda; Hiroo Edakubo, both of Yokohama; Kazuhiro Takahashi, Tokorozawa; Hideyuki Arai, Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/121,059

(22) Filed: Jul. 23, 1998

(30) Foreign Application Priority Data

Jul. 25, 1997 (JP) .............................................. 9-200218

(51) Int. Cl.[7] .............................. H04B 7/00; H04J 3/06; H04J 3/24
(52) U.S. Cl. ........................ 370/310; 370/509; 370/474
(58) Field of Search ................................ 370/230, 282, 370/310, 315, 320, 321, 322, 324, 326, 335, 337, 338, 342, 347, 348, 349, 445, 437, 441, 442, 447, 458, 470, 471, 473, 474, 480, 477, 468, 503, 509; 375/130, 138

(56) References Cited

U.S. PATENT DOCUMENTS 5,592,536 A 1/1997 Parkerson et al. ............. 379/61
6,034,966 A * 3/2000 Ota ............................. 370/443

FOREIGN PATENT DOCUMENTS

| JP | 09-252491 | 9/1997 |
| WO | WO 95/32594 | 11/1995 |
| WO | WO 96/27250 | 9/1996 |

* cited by examiner

Primary Examiner—David R. Vincent
(74) Attorney, Agent, or Firm—Fitzpatrick, Cella, Harper & Scinto (57) ABSTRACT

A transmission station performs carrier sense for a predetermined time and sends a request to send (RTS) signal to the partner station. When a clear to send (CTS) signal is received from the partner station within a predetermined waiting time Tw, the transmission station waits for the AGC rise time and transmits the first packet comprised of a data portion and a header portion containing a synchronization signal (SYNC) and an ID signal. Next, the transmission station continuously transmits the second packet. The header portions of the subsequent packets contain only synchronization signals. With this arrangement, when a plurality of transmission stations want to transmit image data by radio using asynchronous TDMA, image data for one picture can be transmitted in a short time without interruption.

13 Claims, 7 Drawing Sheets

FIG. 8

IMAGE COMMUNICATION APPARATUS, METHOD, AND SYSTEM, AND IMAGE COMMUNICATION PROCESSING PROGRAM CONTAINED IN COMPUTER-READABLE MEDIUM

BACKGROUND OF THE INVENTION

1. Field of the Invention

The present invention relates to an image communication apparatus, method, and system, and an image communication processing program contained in a computer-readable medium and, more particularly, to a technique of communicating image data using asynchronous TDMA (Time Division Multiple Access).

2. Related Background Art

Conventionally, when a plurality of radio (wireless) stations are to perform asynchronous data communication with partner stations by using carrier waves with the same frequency, each of the stations time-divisionally communicates by TDMA (Time Division Multiple Access).

Figure 1:
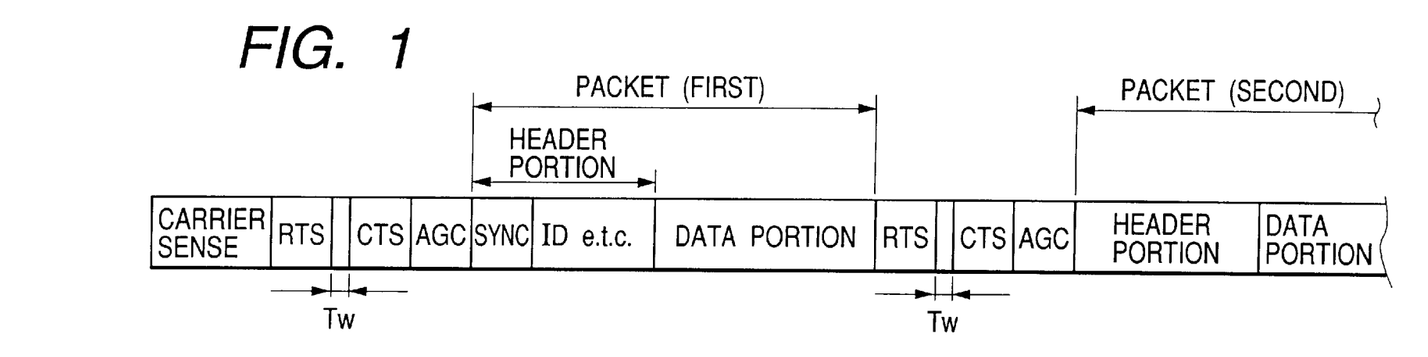
FIG. 1 is a view for explaining a conventional image communication method.

FIG. 1 shows a conventional communication protocol and a data packet format.

Referring to FIG. 1, before communication, the transmission station performs carrier sense to check for a predetermined time whether a radio wave is being sent from another station, thereby avoiding interference between the radio wave from the self station and that from another station. If no radio waves from other stations are detected within the carrier sense time, communication is started; otherwise, carrier sense is continued.

If no radio waves from other stations are detected, the transmission station sends a request to send (RTS) signal to the partner station (station on the reception side). Upon receiving the RTS, the partner station sends a clear to send (CTS) signal for allowing transmission. When a CTS is received within a predetermined waiting time Tw after sending the RTS, the transmission station waits for a predetermined rise time for AGC (Automatic Gain Control) of the partner station and then transmits data packetized into a predetermined packet format.

Each packet has a header portion and a data portion including image or audio data. The header portion is made up of a synchronization signal (SYNC) and a portion including the partner station ID, a unique word representing the start of reception, a status, and a checksum.

Upon completing 1-packet data transmission, the transmission station transmits another RTS. When a CTS is received within the predetermined waiting time Tw, the transmission station transmits packet data again after the elapse of the AGC rise time. For image data, the above operation is repeatedly performed such that an image for one frame or one field is sent as a plurality of packets.

In the above-described conventional communication protocol, however, since RTS/CTS hand shaking is done for each packet, a waiting time Tw is generated for each packet. If another station interrupts during this time Tw, the interrupt and the CTS from the partner station collide. The CTS does not reach the transmission station, and the transmission station cannot send data. Especially, when image data for one picture is to be transmitted, and transmission is stopped due to an interrupt from another station, a partially omitted image is displayed on the monitor on the reception side. Even when the omitted portion is interpolated by a previously stored image, continuity of the image is impaired.

In addition, conventionally, since the header portion in the same data format is sent in units of packets, the packet length increases, and a long time is required to send an image for one frame.

SUMMARY OF THE INVENTION

An object of the present invention is to solve the above-described problems.

It is another object of the present invention to realize, in an image communication apparatus, processing of radio-transmitting image data for one picture in a short time without interruption.

As a preferred embodiment for such objects, according to the present invention, there is provided an image communication apparatus comprising:

generation unit for generating a plurality of communication packets from image data for one picture; and communication unit for continuously radio-transmitting the plurality of communication packets, output from the generation unit, through a radio transmission channel shared by a plurality of devices.

It is another object of the present invention to realize, in an image communication method, processing of radio-transmitting image data for one picture in a short time without interruption.

As a preferred embodiment for such objects, according to the present invention, there is provided an image communication method comprising the steps of:

generating a plurality of communication packets from image data for one picture; and continuously radio-transmitting the plurality of communication packets through a radio transmission channel shared by a plurality of devices.

As another embodiment of the present invention, there is provided an image communication method comprising the steps of:

performing carrier sense in a radio transmission channel shared by a plurality of devices for a predetermined time;

transmitting a transmission request to a destination in accordance with a carrier sense result; and continuously transmitting a plurality of communication packets formed from image data for one picture upon detecting a response to the transmission request within a predetermined time.

It is still another object of the present invention to realize, in an image communication system, processing of radio-transmitting image data for one picture in a short time without interruption.

As a preferred embodiment for such objects, according to the present invention, there is provided an image communication system comprising:

a transmission apparatus and a reception apparatus, wherein the transmission apparatus performs carrier sense in a radio transmission channel shared by a plurality of devices, and transmits a transmission request to the reception apparatus in accordance with a carrier sense result, the reception apparatus returns a response to the transmission request when processing corresponding to the transmission request can be performed, and the transmission apparatus continuously transmits a plurality of communication packets formed from image data for one picture to the reception apparatus upon detecting the response to the transmission request within a predetermined time.

It is still another object of the present invention to realize, in an image communication processing program contained in a computer-readable medium, processing of radio-transmitting image data for one picture in a short time without interruption.

As a preferred embodiment for such objects, according to the present invention, there is provided an image communication processing program contained in a computer-readable medium, comprising:

a program code for generating a plurality of communication packets from image data for one picture; and a program code for continuously radio-transmitting the plurality of communication packets through a radio transmission channel shared by a plurality of devices.

As another embodiment, there is provided an image communication processing program contained in a computer-readable medium, comprising:

a program code for performing carrier sense in a radio transmission channel shared by a plurality of devices for a predetermined time;

a program code for transmitting a transmission request to a destination in accordance with a carrier sense result; and a program code for continuously transmitting a plurality of communication packets formed from image data for one picture upon detecting a response to the transmission request within a predetermined time.

Still other objects of the present invention, and the advantages thereof, will become fully apparent from the following detailed description of the embodiments.

DESCRIPTION OF THE PREFERRED EMBODIMENTS

Preferred embodiments of the present invention will now be described in detail hereinafter with reference to the accompanying drawings.

1. First Embodiment

Figure 2:
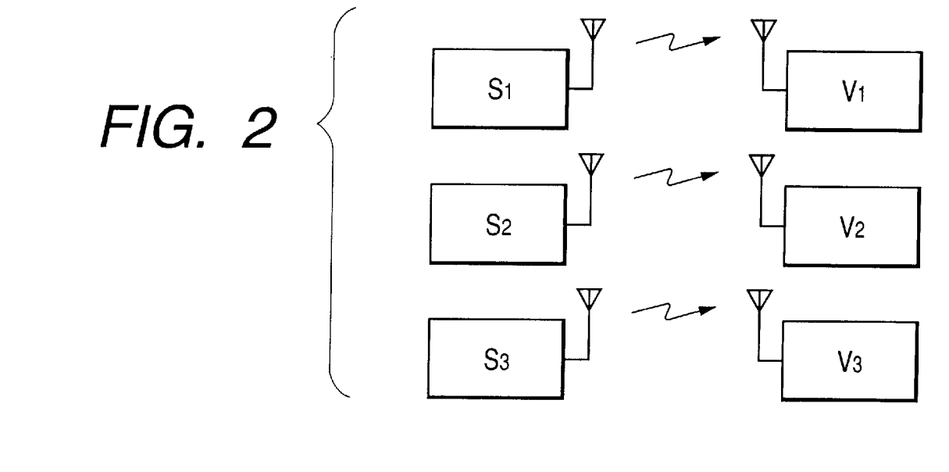
FIG. 2 is a view showing the arrangement of an image transmission system according to the embodiment.

FIG. 2 is a view showing the arrangement of an image transmission system of this embodiment. Referring to FIG. 2, the image transmission system of this embodiment is comprised of a plurality of image communication apparatuses S1, S2, S3, V1, V2, and V3. Each of the apparatuses S1, S2, and S3 is a transmission station which radio-transmits image data sensed by a TV camera unit to a corresponding one of the partner stations V1, V2, and V3.

In FIG. 2, each of the transmission stations S1, S2, and S3 has a TV camera unit such as a camcoder. An image sensed by the camera unit is compressed/coded and then modulated on a carrier wave having the same frequency in the 2.4 GHz band by spread spectrum modulation (to be referred to as SS modulation hereinafter) using code division multiplex. The modulated image data is asynchronously radio-transmitted from the antenna of each station to a corresponding one of the partner stations V1, V2, and V3. In the system shown in FIG. 2, the transmission stations and the partner stations are in a one-to-one correspondence. However, a plurality of partner stations may correspond to one transmission station, or a plurality of transmission stations may correspond to one partner station.

Figure 3:
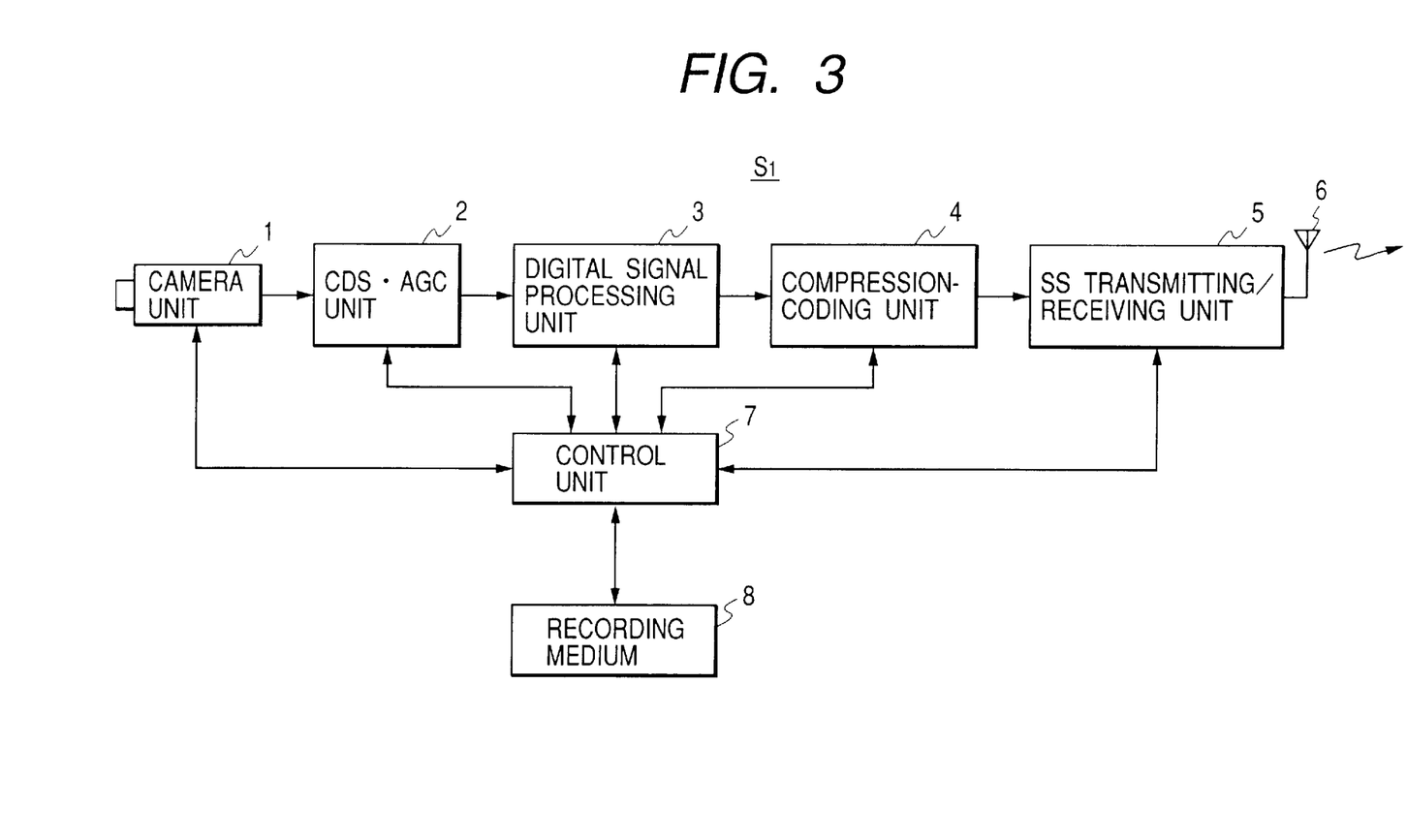
FIG. 3 is a block diagram showing the arrangement of an image communication apparatus (transmission station) of the embodiment.

FIG. 3 shows the arrangement of the transmission station S1 as the image communication apparatus of this embodiment. The remaining stations S2 and S3 also have the same arrangement as in FIG. 3.

In FIG. 3, a camera unit 1 outputs an image signal sensed using an image sensing device such as a CCD. A CDS/AGC unit 2 performs noise removal and AGC (Automatic Gain Control) for the output signal from the camera unit 1. A digital signal processing unit 3 performs predetermined digital signal processing for the output signal from the CDS/AGC unit 2. A compression-coding unit 4 compresses/codes the output signal from the digital signal processing unit 3 using JPEG.

The compression-coding unit 4 compresses/codes each image data for one picture. More specifically, the compression-coding unit 4 segments (divides) image data for one picture into a plurality of block data and performs DCT transformation, quantization, and variable length coding in units of block data. Each block data is made up of a plurality of pixel signal components.

Figure 4:
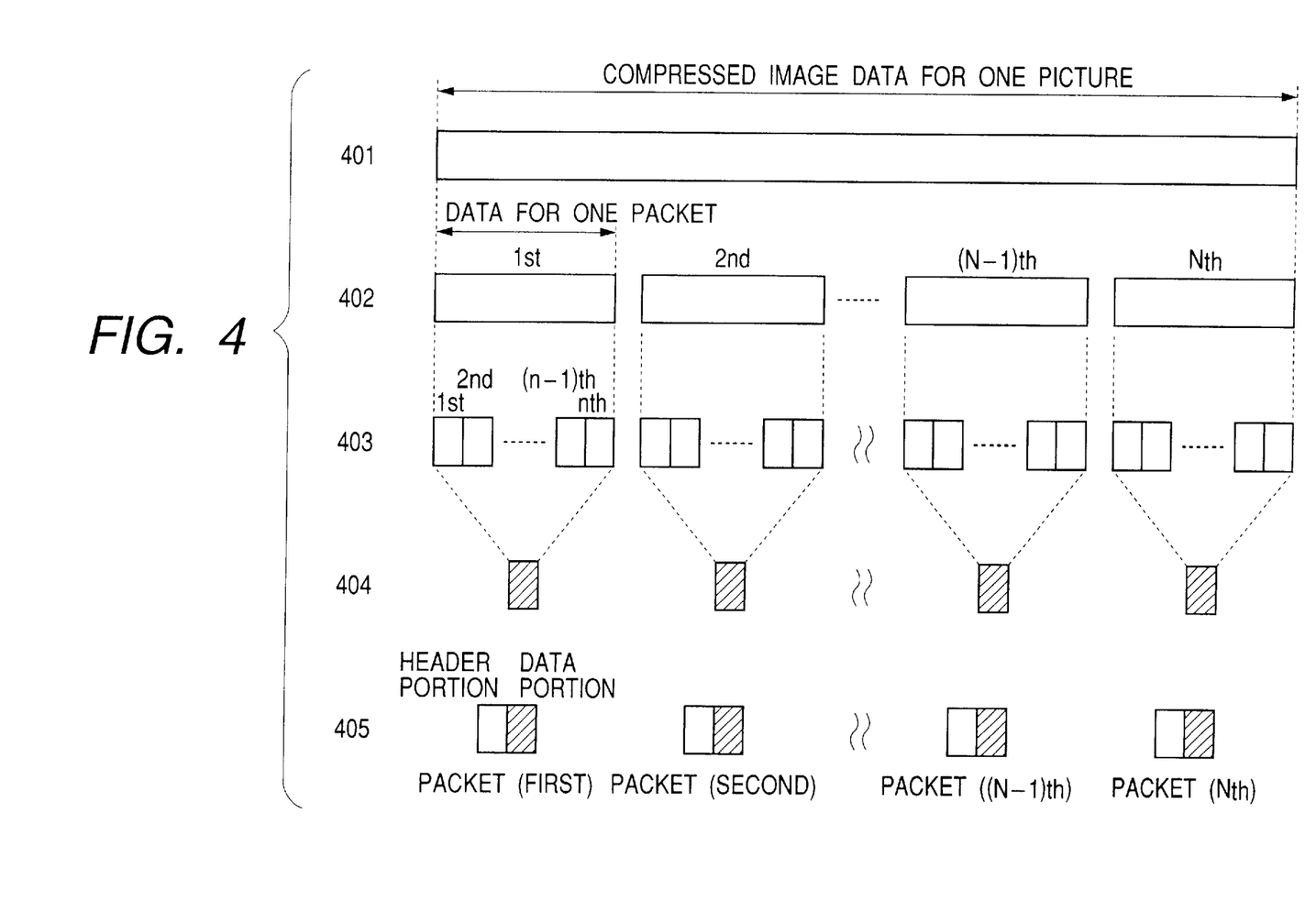
FIG. 4 is a view for explaining the format of data to be processed by the image communication apparatus (transmission station) of the embodiment.

As shown in FIG. 4, the compression-coding unit 4 breaks up compressed image data 401 for one picture into N packet data 402 and sequentially supplies each packet data to an SS transmitting/receiving unit 5. Each packet data 402 has a plurality of block data.

The value N is variably set by a control unit 7. The control unit 7 sets an optimum value in accordance with the error state in the radio transmission channel or the amount of compressed image data for one picture.

The SS transmitting/receiving unit 5 SS-modulates the compressed/coded image data by code division multiplex using a carrier wave in the 2.4 GHz band. The modulated image data is transmitted from the SS transmitting/receiving unit 5 through an antenna 6 by radio. At this time, the control unit 7 controls the SS transmitting/receiving unit 5 on the basis of the communication protocol of this embodiment (to be described later). The image data transmitted by ratio contains ID signals representing the transmission station and the corresponding partner station.

The SS transmitting/receiving unit 5 receives a carrier wave signal having the above frequency, which is transmitted from one of the remaining transmission stations S2 and S3 and the partner stations V1, V2, and V3. The control unit 7 performs carrier sense on the basis of the received signal and simultaneously controls communication. The control unit 7 also controls the respective units 1 to 4 in a predetermined manner.

The camera unit 1 may have an image recording/reproducing device such as a VTR for recording/reproducing the sensed image signal.

A recording medium 8 stores program codes for realizing the communication protocol of this embodiment. This program codes can be read by a microcomputer incorporated in the control unit 7. The control unit 7 controls the operation of the SS transmitting/receiving unit on the basis of the program codes.

Each of the image communication apparatuses S1, S2, and S3 of this embodiment may be a camcoder or a digital camera as far as it can realize the arrangement and function shown in FIG. 3.

Figure 5:
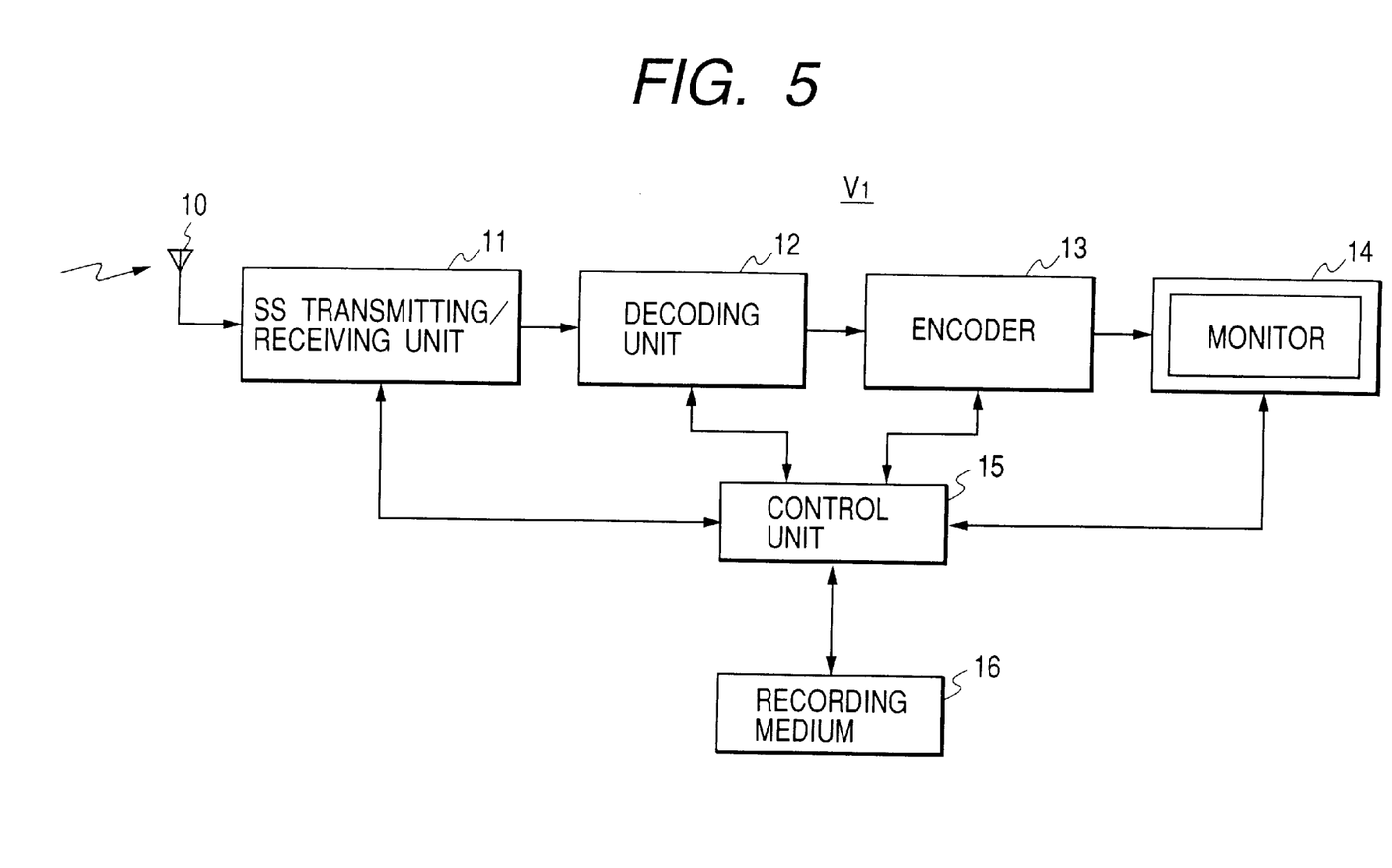
FIG. 5 is a block diagram showing an image communication apparatus (the partner station) of the embodiment.

FIG. 5 shows the arrangement of the partner station V1 as the image communication apparatus of this embodiment. The remaining partner stations V2 and V3 also have the same arrangement as in FIG. 5.

In FIG. 5, an SS transmitting/receiving unit 11 demodulates a signal (image data or the like) addressed to the self station and received via an antenna 10. A decoding unit 12 expands/decodes the output signal from the SS transmitting/receiving unit 11. An encoder 13 converts the image data decoded by the decoding unit 12 into an NTSC image signal or the like. A monitor 14 displays the output signal from the encoder 13. A control unit 15 controls the SS transmitting/receiving unit 11 on the basis of the communication protocol of this embodiment and simultaneously controls the respective units 12 to 14 in a predetermined manner.

Referring to FIG. 5, a recording medium 16 stores program codes for realizing the communication protocol of this embodiment. These program codes can be read by a microcomputer incorporated in the control unit 15. The control unit 15 controls the operation of the SS transmitting/recieving unit 11 on the basis of the program codes.

Figure 6:
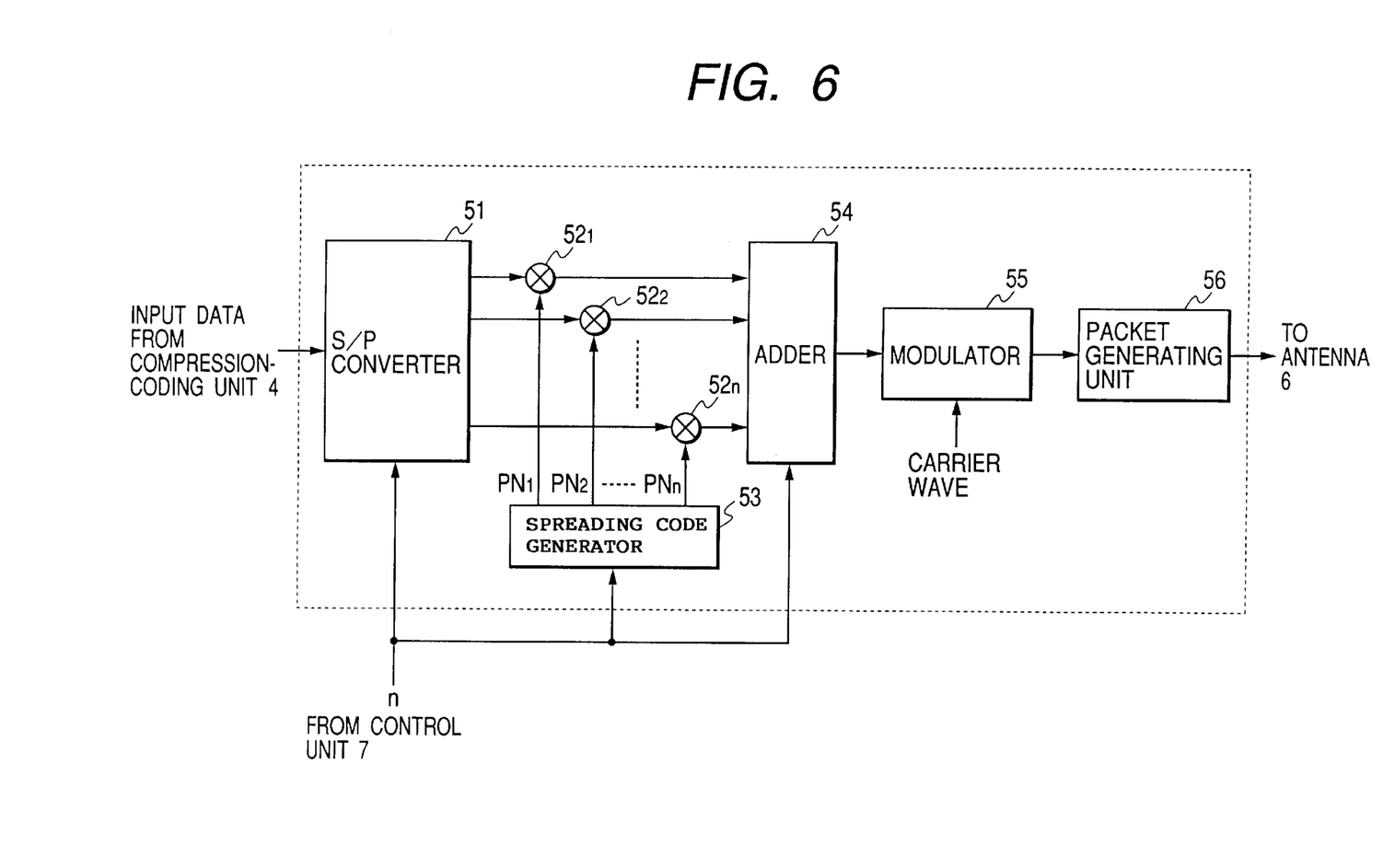
FIG. 6 is a block diagram showing the arrangement of part of an SS transmitting/receiving unit 5 of the embodiment.

FIG. 6 shows the arrangement of part of the SS transmitting/receiving unit 5. SS modulation based on code division multiplex of this embodiment will be described.

In FIG. 6, compressed image data (serial data) for one packet, which is output from the compression-coding unit 4, is converted into n parallel data (each parallel data has m bits) by an S/P converter 51. Each parallel data is supplied to multipliers $52_1$ to $52_n$ in units of bits and multiplied by a corresponding one of n spreading codes $PN_1$ to $PN_n$ generated by a diffusion code generator 53. The outputs from the multipliers $52_1$ to $52_n$ are added by an adder 54. A modulator 55 phase-modulates the output from the adder 54 on a carrier wave having an appropriate center frequency in, e.g., the 2.4 GHz band. With this processing, the SS transmitting/receiving unit 5 can obtain a modulated signal spread in a wide band.

As shown in FIG. 4, the S/P converter 51 converts the serially input packet data 402 into n parallel data 403. The adder 54 adds the products of the n parallel data 403 and the n diffusion codes $PN_1$ to $PN_n$ and supplies a sum 404 to a packet generating unit 56 through the modulator 55.

As shown in FIG. 4, the packet generating unit 56 adds header information to compressed image data for one packet, which is modulated by the modulator 55, to generate a communication packet 405. The header portion of the first communication packet 405 contains a synchronization signal (SYNC), partner station ID, a unique word representing the start of transmission, status information, and checksum.

The SS transmitting/receiving unit 5 continuously transmits, via the antenna 6, N communication packets generated in the above procedure to the radio communication channel shared by the image communication apparatuses.

By using SS modulation based on code division multiplex, the SS transmitting/receiving unit 5 can reduce the number of times of communication to 1/n, as compared to a case wherein compressed image data for one picture (image for one frame or one field) is SS-modulated using a diffusion code of one kind.

In FIG. 6, the value n supplied to the S/P converter 51, the diffusion code generator 53, and the adder 54 is variably set by the control unit 7. The control unit 7 sets an optimum value in accordance with the error state in the radio transmission channel or the amount of compressed image data for one picture. The value n is kept unchanged for N communication packets formed from compressed image data for one picture. Therefore, a variation in processing time for each of the N communication packets is suppressed, and continuity of N communication packets is not impaired.

Figure 7:
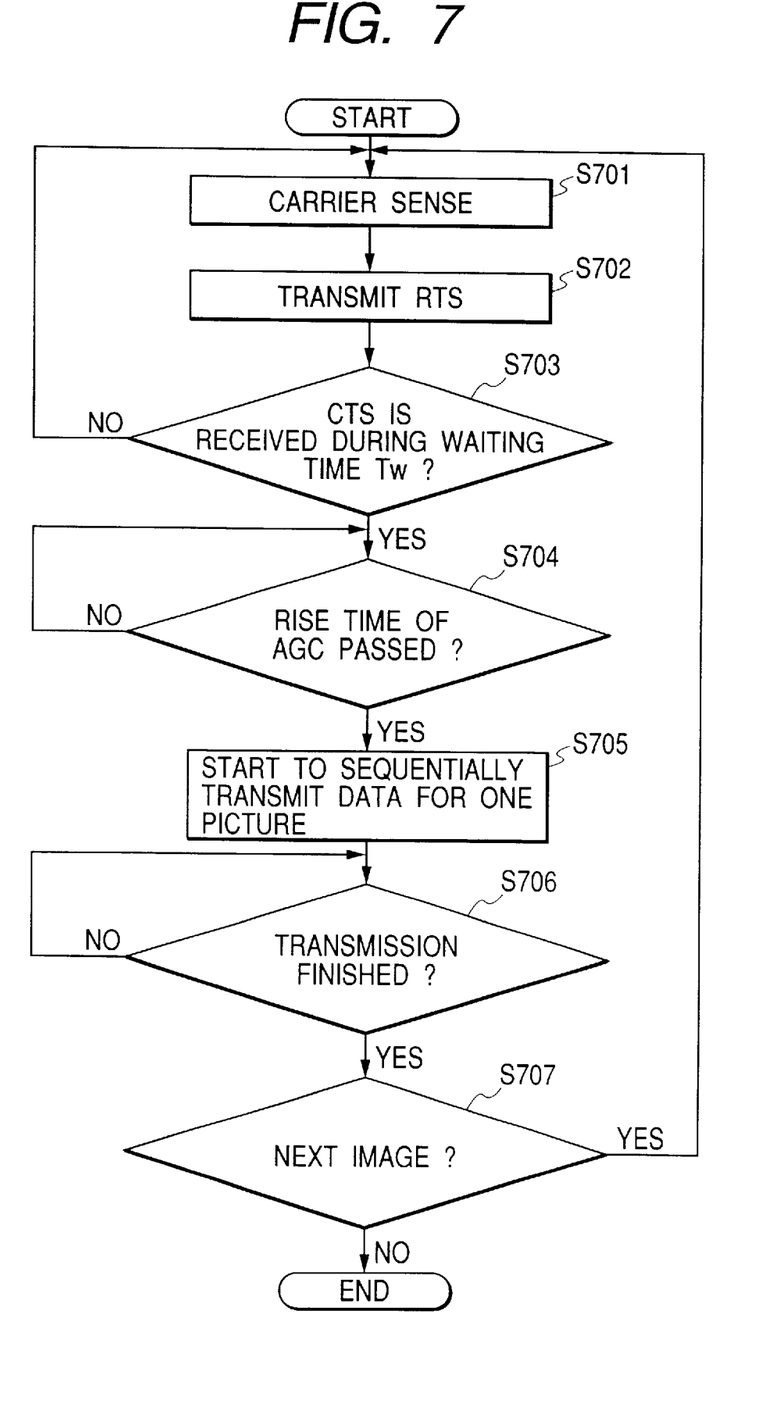
FIG. 7 is a flowchart for explaining the processing procedure of a communication protocol of the embodiment.
Figure 8:
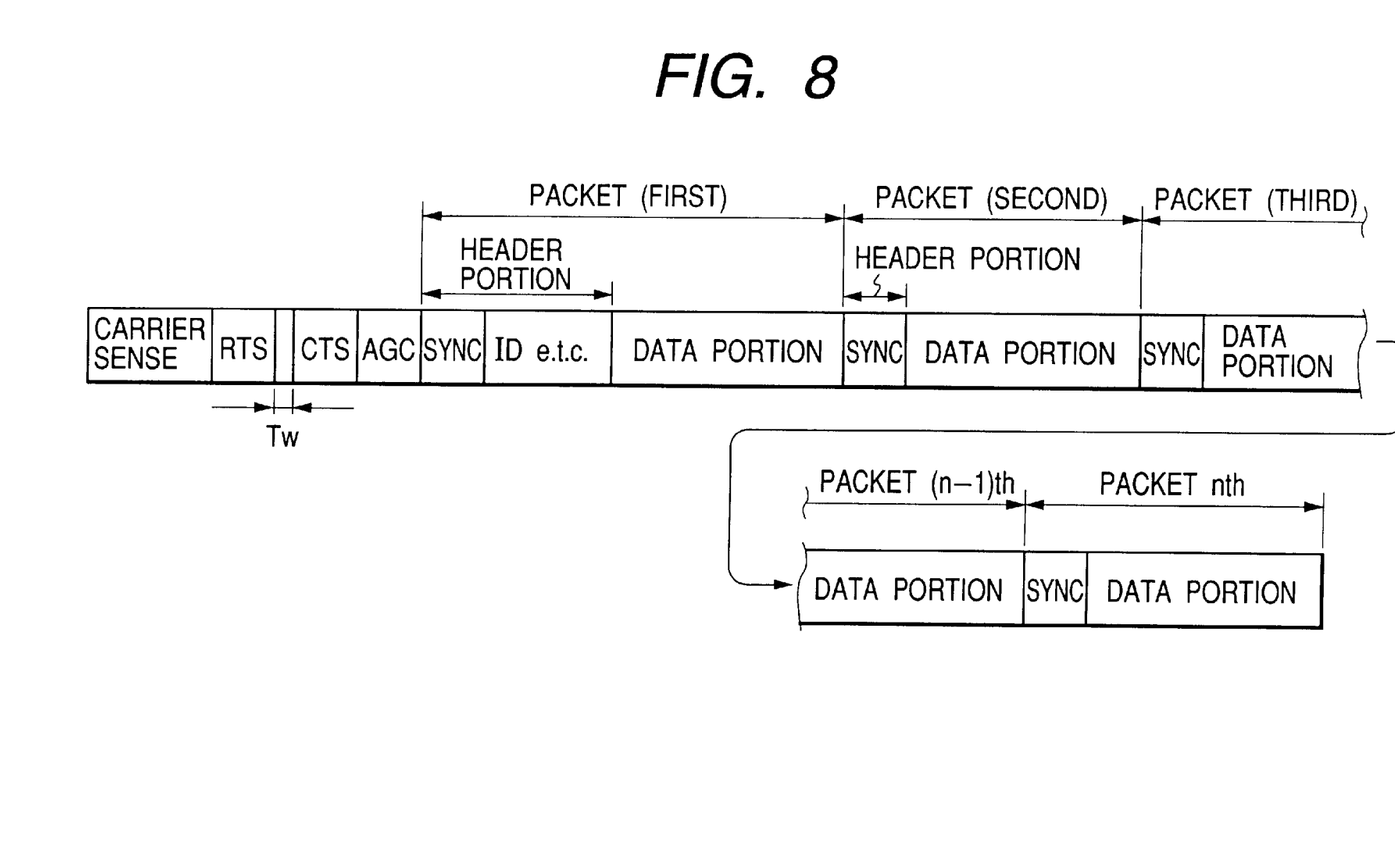
FIG. 8 is a view showing the data packet format of the embodiment.

FIG. 7 is a flowchart for explaining the processing procedure of the communication protocol of this embodiment. FIG. 8 is a view showing the data packet format of this embodiment. The processing procedure of the communication protocol of this embodiment will be described below with reference to FIGS. 7 and 8.

In step S701, the transmission station (S1, S2, or S3) performs carrier sensing before starting communication of the self station to prevent interference between the radio wave from the self station and that from another station. In carrier sensing, it is determined for a predetermined time whether another station is transmitting a radio wave.

When a radio wave from another station is detected during the predetermined time, the transmission station performs carrier sensing again. If no radio wave from other stations is detected during the predetermined time, the transmission station executes processing from step S702.

In step S702, the transmission station (S1, S2, or S3) transmits a request to send (RTS) signal to the partner station (V1, V2, or V3). The partner station receives the RTS addressed to itself. If communication with the transmission station is possible, the partner station transmits a clear to send (CTS) signal as a response to the RTS.

In step S703, the transmission station (S1, S2, or S3) waits for a CTS transmitted from the partner station during a predetermined waiting time Tw after sending the RTS. If a CTS is not received within the waiting time Tw, the transmission station executes carrier sense again.

In step S704, upon receiving the CTS from the partner station, the transmission station (S1, S2, or S3) waits for the rise time of AGC of the partner station.

In step S705, the transmission station starts radio transmission of compressed image data for one picture. The compressed image data for one picture (e.g., one frame or one field) is composed of N (N is an integer >1) communication packets, as shown in FIG. 8. For example, in this embodiment, compressed image data for one frame is transmitted by radio as 16 communication packets.

Upon completing transmission of the first packet, the transmission station sends the second packet. The header portion of the second packet contains only a synchronization signal (SYNC). The header portion of the third packet also contains only a synchronization signal. These packets are sequentially transmitted. In this manner, by sequentially transmitting data for, e.g., 16 packets, the transmission station can transmit image data for one frame without interruption.

In step S706, the transmission station detects whether transmission of the N communication packets is complete. If NO in step S706, all the remaining communication packets are transmitted.

If transmission of the N communication packets is complete, the transmission station determines in step S707 whether image data for the next picture is to be transmitted. If YES in step S707, the transmission station executes carrier sense again. If NO in step S707, processing is ended.

On the basis of this communication protocol, the transmission station (S1, S2, or S3) transmits a still image for one picture or a moving image for a plurality of pictures through the radio transmission channel shared by the remaining transmission stations.

In this manner, the transmission station of this embodiment continuously transmits compressed image data for one frame (or one field) as a plurality of packets. With this processing, an interrupt from another station during transmission can be prevented. In addition, the partner station can receive the image for one picture, i.e., one frame (or one field) and display it on the monitor without interruption.

In this embodiment, when N packets are to be continuously sent, data other than the synchronization signal (SYNC) are omitted in the header portions of packets subsequent to the first packet. With this arrangement, the transmission data length for one picture is shortened as compared to the prior art, so the data transmission time can be shortened. Also, the partner station can appropriately establish synchronization on the basis of the synchronization signal (SYNC) sent together with each packet.

(Other Embodiments)

The above-described embodiment can also be realized as follows.

For example, a recording medium storing program codes of software for realizing the function of the first embodiment may be supplied to the control unit (including a microcomputer) of the system or apparatus of the first embodiment.

In this case, the control unit of the system or apparatus of the first embodiment reads out the program codes stored in the recording medium and controls the operation of the system or apparatus such that the function of the above embodiment is realized, thereby realizing the first embodiment.

For example, the recording medium 8 storing the program codes for realizing the function of the communication protocol shown in FIG. 7 in the first embodiment may be supplied to the control unit 7 shown in FIG. 3. The control unit 7 may read out the program codes stored in the recording medium 8 and control the processing circuits in FIG. 3 such that the function of the communication protocol of the first embodiment is realized.

In this case, the program codes read out from the recording medium 8 realize the function of the first embodiment by themselves. The recording medium 8 storing the program codes partially constitutes the present invention.

As the recording medium 8 for supplying the program codes, a floppy disk, a hard disk, an optical disk, a magnetooptical disk, a CD-ROM, a CD-R, a magnetic tape, a nonvolatile memory card, a ROM, or the like can be used.

The program codes of software for realizing the function of the first embodiment may be recorded in the recording medium 8 in advance or supplied from an external device through the SS transmitting/receiving unit 5.

The present invention also incorporates a case wherein an OS (Operating System) or application software running on the control unit 7 controls the operation of the system or apparatus of the first embodiment on the basis of instructions of the program codes read out from the recording medium 8 to realize the function of the first embodiment.

The present invention further incorporates a case wherein the program codes read out from the recording medium 8 are written in a memory of a function expansion board or function expansion unit connected to the control unit 7, and then, the control unit of the function expansion board or function expansion unit itself controls the operation of the apparatus or system of the first embodiment on the basis of instructions of the program codes to realize the function of the first embodiment.

The invention may be embodied in other specific forms without departing from the spirit or essential characteristics thereof.

For example, in this embodiment, the AGC rise time may be inserted at various points during transmission of each packet, as needed.

In this embodiment, SS modulation is used as the scheme of modulating data to be transmitted by radio. However, another modulation scheme may be used. In addition, the present invention can be applied to a system wherein each of a plurality of radio stations asynchronously and time-divisionally communicates with the partner station using a common radio transmission channel while checking transmission of another radio station for a predetermined time.

Therefore, the above-mentioned embodiments are merely examples in all respects, and must not be construed to limit the invention.

The scope of the present invention is defined by the scope of the appended claims, and is not limited at all by the specific descriptions of this specification. Furthermore, all the modifications and changes belonging to equivalents of the claims are considered to fall within the scope of the present invention.

What is claimed is:

1. An image transmitting apparatus which transmits compressed image data of one image, comprising:
    a divider which divides the compressed image data into a plurality of divided image data having header portions; and
    a wireless transmitter that continuously transmits the plurality of divided image data,
    wherein the wireless transmitter adds ID information of a destination apparatus and synchronization information into the header portion of the first divided image data and adds synchronization information without the ID information into the header portions of the remaining divided image data.

2. An apparatus according to claim 1, wherein said wireless transmitter comprises a spread spectrum modulator.

3. An apparatus according to claim 2, wherein the spread spectrum modulator modulates the compressed image data using spreading codes.

4. An apparatus according to claim 1, wherein the compressed image data is compressed by a JPEG format.

5. An image transmitting method of transmitting compressed image data of one image, comprising the steps of:
    dividing the compressed image data into a plurality of divided image data having header portions; and
    continuously transmitting the plurality of divided image data from a wireless transmitter,
    wherein the transmitting step adds ID information of a destination apparatus and synchronization information into the header portion of the first divided image data and adds synchronization information without the ID information into the header portions of the remaining divided image data.

6. A method according to claim 5, wherein said wireless transmitter comprises a spread spectrum modulator.

7. A method according to claim 6, wherein the spread spectrum modulator modulates the compressed image data using spreading codes.

8. A method according to claim 5, wherein the compressed image data is compressed by a JPEG format.

9. An image sensing apparatus comprising:
    an image sensor which generates image data of one image;
    an image compressor which compresses the image data into compressed image data;
    a divider which divides the compressed image data into a plurality of divided image data having header portions; and a wireless transmitter that continuously transmits the plurality of divided image data, wherein the wireless transmitter adds ID information of a destination apparatus and synchronization information into the header portion of the first divided image data and adds synchronization information without the ID information into the header portions of the remaining divided image data.

10. An apparatus according to claim 9, wherein said wireless transmitter comprises a spread spectrum modulator.

11. An apparatus according to claim 10, wherein the spread spectrum modulator modulates the compressed image data using spreading codes.

12. An apparatus according to claim 9, wherein said image compressor compresses the image data in accordance with a JPEG format.

13. An apparatus according to claim 9, wherein said apparatus comprises a digital camera.

* * * * *

UNITED STATES PATENT AND TRADEMARK OFFICE
CERTIFICATE OF CORRECTION

PATENT NO.    : 6,385,177 B1                                          Page 1 of 1
DATED         : May 7, 2002
INVENTOR(S)   : Hirofumi Suda et al.

It is certified that error appears in the above-identified patent and that said Letters Patent is hereby corrected as shown below:

<u>Column 6,</u>
Line 41, "integer >1)" should read -- integer $\geq 1$) --.

Signed and Sealed this

Nineteenth Day of November, 2002

Attest:

Attesting Officer

JAMES E. ROGAN
*Director of the United States Patent and Trademark Office*